(12) United States Patent
Chennupati et al.

(10) Patent No.: US 11,021,188 B2
(45) Date of Patent: Jun. 1, 2021

(54) SYSTEMS WITH RADIO FREQUENCY RESONATORS, TUNING ELEMENTS, AND SPECTRUM ANALYZERS TO PROVIDE VALUES OF RESONANCE PARAMETERS

(71) Applicant: TEXAS INSTRUMENTS INCORPORATED, Dallas, TX (US)

(72) Inventors: Siva RaghuRam Prasad Chennupati, Unterschleissheim (DE); Sandeep Tallada, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 461 days.

(21) Appl. No.: 15/859,280

(22) Filed: Dec. 29, 2017

(65) Prior Publication Data

US 2019/0002025 A1    Jan. 3, 2019

Related U.S. Application Data

(60) Provisional application No. 62/527,802, filed on Jun. 30, 2017.

(51) Int. Cl.
*B62D 15/02* (2006.01)
*G01N 21/3581* (2014.01)
*H01P 7/06* (2006.01)

(52) U.S. Cl.
CPC ....... *B62D 15/0215* (2013.01); *B62D 15/024* (2013.01); *G01N 21/3581* (2013.01); *H01P 7/06* (2013.01)

(58) Field of Classification Search
CPC .............. B62D 15/0215; B62D 15/024; G01N 27/327; G01N 21/3581; H01P 7/06; A61N 7/02; G06F 1/16
USPC ........... 324/754.1, 500, 636, 754.03, 754.01, 324/754.13, 754.14, 756.03, 756.04, 324/757.04, 757.05, 754.2
See application file for complete search history.

(56) References Cited

U.S. PATENT DOCUMENTS

| | | | |
|---|---|---|---|
| 2010/0017064 A1* | 1/2010 | Kojima | B62D 5/0457 701/42 |
| 2012/0105176 A1* | 5/2012 | Kapfinger | H01P 7/04 333/209 |
| 2015/0116153 A1* | 4/2015 | Chen | H01Q 9/145 342/359 |
| 2017/0250678 A1* | 8/2017 | Juntunen | H01P 1/2056 |

* cited by examiner

*Primary Examiner* — Melissa J Koval
*Assistant Examiner* — Trung Q Nguyen
(74) *Attorney, Agent, or Firm* — John R. Pessetto; Charles A. Brill; Frank D. Cimino

(57) ABSTRACT

A system comprises: a radio frequency (RF) resonator comprising a cavity and a tuning element, the cavity having at least one port, and the tuning element having a length inside the cavity; a processor; a spectrum analyzer coupled to the at least one port, the spectrum analyzer to provide to the processor values of a resonance parameter, the resonance parameter indicative of a resonant wavelength of the RF resonator; and an automotive steering mechanism coupled to the tuning element.

9 Claims, 3 Drawing Sheets

SYSTEMS WITH RADIO FREQUENCY RESONATORS, TUNING ELEMENTS, AND SPECTRUM ANALYZERS TO PROVIDE VALUES OF RESONANCE PARAMETERS

CROSS-REFERENCE TO RELATED APPLICATION

The present application claims priority to U.S. Provisional Patent Application No. 62/527,802, which was filed Jun. 30, 2017, is titled "RF-CAVITY-SENSOR," and is hereby incorporated herein by reference in its entirety.

BACKGROUND

Microwave cavities serve as resonant microwave circuits, where the resonant frequencies depend upon the size of the cavities, as well as structures inside the cavities. For example, one or more tuning screws in a microwave cavity can be adjusted to change the resonant frequency. Two-port microwave cavities can be used as bandpass or notch filters.

SUMMARY

In accordance with a first set of embodiments, a system comprises: a radio frequency (RF) resonator comprising a cavity and a tuning element, the cavity having at least one port, and the tuning element having a length inside the cavity; a processor; a spectrum analyzer coupled to the at least one port, the spectrum analyzer to provide to the processor values of a resonance parameter, the resonance parameter indicative of a resonant wavelength of the RF resonator; and an automotive steering mechanism coupled to the tuning element.

In accordance with the first set of embodiments, in the system, the steering mechanism comprises a steering wheel, and the length of the tuning element inside the cavity changes in response to a rotation of the steering wheel.

In accordance with the first set of embodiments, in the system, the resonant wavelength is a first or higher order odd harmonic of the RF resonator.

In accordance with the first set of embodiments, in the system, the higher order odd harmonic is a third or fifth harmonic of the RF resonator.

In accordance with the first set of embodiments, the system further comprises a memory coupled to the processor, wherein the memory stores a look-up table and instructions, wherein the instructions when executed by the processor cause the processor to compute a value indicative of the length inside the cavity based upon the look-up table and a value of the resonance parameter provided by the spectrum analyzer.

In accordance with the first set of embodiments, in the system, the memory is integrated with the processor.

In accordance with the first set of embodiments, in the system, the tuning element and the cavity each comprises metal.

In accordance with the first set of embodiments, in the system, the at least one port comprises a first port and a second port, the system further comprising: a first loop antenna coupled to the first port; and a second loop antenna coupled to the second port; wherein the spectrum analyzer comprises an RF transmitter and an RF receiver, the RF transmitter comprising an output port coupled to the first loop antenna, and the RF receiver comprising an input port coupled to the second loop antenna.

In accordance with the first set of embodiments, in the system, the spectrum analyzer measures a magnitude of a scattering parameter of the RF resonator to provide to the processor the values of the resonance parameter.

In accordance with the first set of embodiments, in the system, the at least one port comprises a first port, the system further comprising: a loop antenna coupled to the first port; wherein the spectrum analyzer comprises an RF transmitter, the RF transmitter comprising an output port coupled to the loop antenna, and wherein the spectrum analyzer measures a reflected power in response to transmission by the RF transmitter to provide to the processor the values of the resonance parameter.

In accordance with a second set of embodiments, a system comprises: a solenoid actuator comprising a plunger and a cavity, the plunger movable into the cavity and having a length inside the cavity, and the cavity having at least one port; a processor; and a spectrum analyzer coupled to the at least one port, the spectrum analyzer to provide to the processor values of a resonance parameter, the resonance parameter indicative of a resonant wavelength of the cavity.

In accordance with the second set of embodiments, in the system, the spectrum analyzer is integrated with the solenoid actuator.

In accordance with the second set of embodiments, the system further comprises a transmission, wherein the solenoid actuator is part of the transmission.

In accordance with the second set of embodiments, in the system, the transmission has a transmission fluid, wherein the cavity includes at least one opening to receive at least a portion of the transmission fluid.

In accordance with the second set of embodiments, in the system, the spectrum analyzer to measure an RF signal returned from the RF cavity in response to exciting the RF cavity.

In accordance with the second set of embodiments, the system further comprises at least one loop antenna coupled to the at least one port, wherein the spectrum analyzer is coupled to the at least one loop antenna.

In accordance with the second set of embodiments, the system further comprises: a solenoid coil; and a controller coupled to the solenoid coil to position the plunger to a determined position with respect to the cavity.

In accordance with a third set of embodiments, a method comprises: moving a tuning element relative to a radio frequency (RF) cavity of an RF resonator, the tuning element having a length in the RF cavity; providing values of a resonance parameter to a processor, the resonance parameter indicative of a resonant wavelength of the RF resonator; and accessing, under execution of instructions stored in the processor, a look-up table stored in a memory to read values of a length parameter associated in the look-up table with values of the resonance parameter, wherein the length parameter is indicative of the length of the tuning element in the RF cavity.

In accordance with the third set of embodiments, the method further comprises: causing the tuning element to be at a determined position relative to the RF cavity; and measuring an RF signal returned from the RF cavity in response to exciting the RF cavity, wherein the RF cavity includes a fluid.

In accordance with the third set of embodiments, the method further comprises exchanging the fluid in the RF cavity with a fluid in a transmission.

BRIEF DESCRIPTION OF THE DRAWINGS

For a detailed description of various examples, reference will now be made to the accompanying drawings in which.

DETAILED DESCRIPTION

Disclosed herein are systems comprising microwave resonant devices with applications for detecting mechanical rotations or displacements, and with applications for detecting the condition of fluids. Specific applications include automotive applications.

In an automotive application, it is desirable to measure in real-time the angular rotation of automotive steering mechanisms (e.g., a steering column). In accordance with disclosed embodiments, a system to measure the angular rotation of a steering mechanism includes a microwave cavity with a tuning element, where the tuning element is coupled to the steering mechanism so that a rotation of the steering mechanism changes the length of the tuning element inside the microwave cavity. Measuring the resonant frequency of the microwave cavity can be used to determine this length.

In another automotive application, an automatic transmission employs solenoid actuators. A system includes a microwave cavity integrated with a solenoid actuator so that the plunger of the solenoid value is mechanically coupled to a tuning element, or where the plunger itself is part of the tuning element. The state of the solenoid actuator can be determined by measuring the resonant frequency of the microwave cavity. Furthermore, in some embodiments, the microwave cavity can include apertures (orifices) so that transmission fluid fills the microwave cavity. When the solenoid actuator is put into a known state, measuring the resonant frequency or impedance of the microwave cavity can provide information about the condition of the transmission fluid, such as, for example, whether the transmission should be flushed and replaced with new transmission fluid.

The disclosed embodiments find utility outside of automotive applications. For example, embodiments can find applications in industrial processes where real-time displacements or rotations are measured, or where fluids are monitored.

Figure 1:
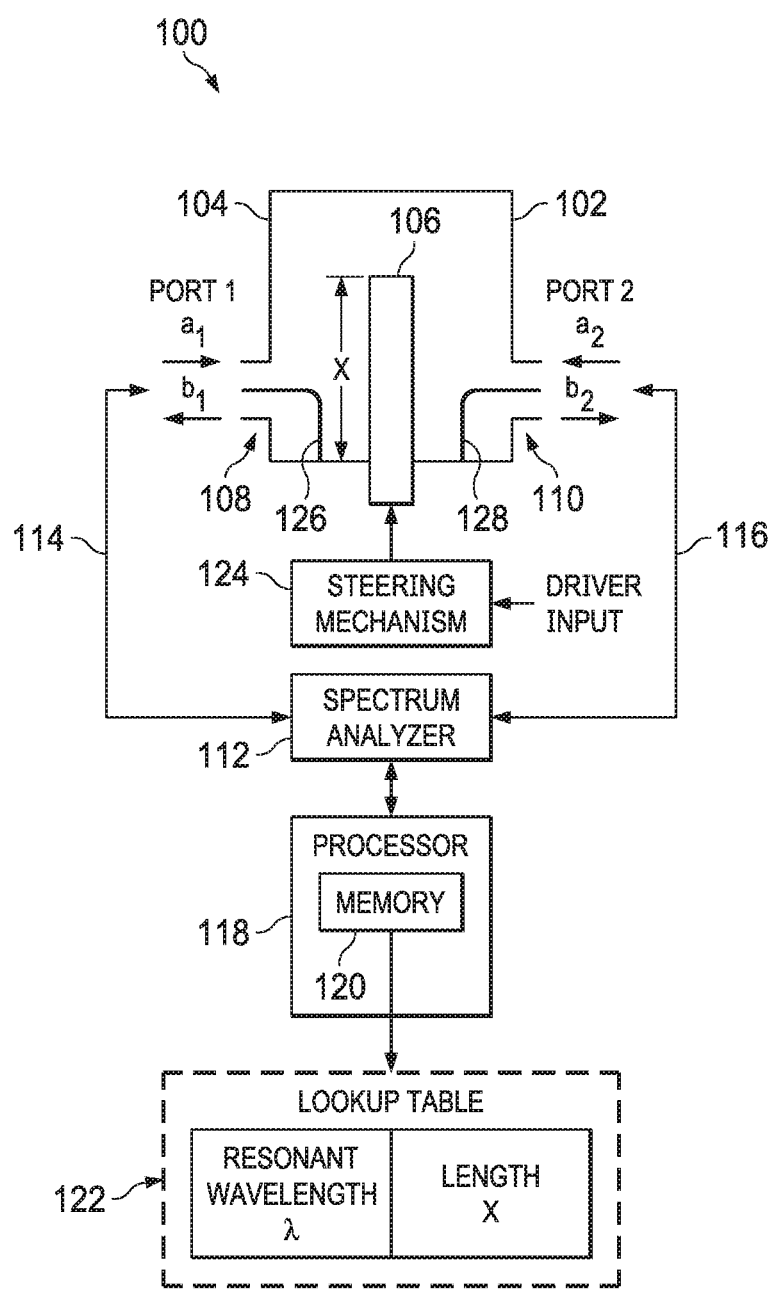
FIG. 1 shows a system in accordance with various examples.

FIG. 1 shows an illustrative system 100. A radio frequency (RF) resonator 102 comprises a cavity 104 and a tuning element 106. The tuning element 106 has a length inside the cavity 104, denoted by a parameter x in FIG. 1. The tuning element 106 is movable with respect to the cavity 104, so that the length x is variable. In some embodiments, the tuning element 106 is shaped as a rod, and can be threaded so that a rotation of the tuning element 106 is translated into a vertical motion of the tuning element 106.

The cavity 104 is a conductive (e.g., metallic) cavity, such as a hollow, substantially closed can or cylinder. In the particular embodiment of FIG. 1, the cavity 104 has more than one opening, such as, for example, an opening for the tuning element 106, a port 108, and a port 110. Assuming that the tuning element 106 substantially fills the opening in the cavity 104 for receiving the tuning element 106, the cavity 104 for the embodiment of FIG. 1 is a two-port microwave network. In some embodiments, the cavity 104 can have more than two ports, or the cavity 104 can have only one port.

The cavity 104 has a resonant frequency (or wavelength) depending upon the length x of the tuning element 106, as well as other parameters. The resonant frequency of interest is in the GHz range. Embodiments have several detectable harmonics, where for example the cavity 104 resonates at odd harmonics when the tuning element 106 extends into the cavity 104 one quarter wavelength. As a specific example, a tested prototype comprises a cavity having a 16 mm square base with a 4 mm thick, variable 40 mm long tuning element. For this particular prototype, it is found that the resonant frequency changes from 4 GHz (at a minimum position for the tuning element) to 5.3 GHz at a 1 cm displacement of the tuning element 106.

To measure the resonant frequency (or wavelength) of the cavity 104, a spectrum analyzer 112 is coupled to the port 108 and to the port 110 by way of waveguides. In the description of the embodiments, the term waveguide can encompass a transmission line, a coaxial cable, and any other type of structure used for guiding the propagation of microwave radiation. The coupling arrows 114 and 116 represent such waveguides.

The spectrum analyzer 112 includes a transmitter coupled to the port 108 to transmit a microwave signal, and a receiver coupled to the port 110 to receive and measure the amplitude of a microwave signal. The frequency of the transmitted microwave signal is swept over a range so that the resonant frequencies (wavelengths) of the cavity 104 are to be determined. For some embodiments, odd harmonics are of interest, and for some embodiments, the third harmonic or the fifth harmonic are of interest because of the relatively narrow bandwidth of the cavity 104 at these harmonics.

In the particular embodiment of FIG. 1, the cavity 104 presents itself as a two-port microwave network to the spectrum analyzer 112. Following standard terminology, $a_1$ represents the in-going wave at the port 108 ("port 1"), $b_1$ represents the out-going wave at the port 108, $a_2$ represents the in-going wave at the port 110 ("port 2"), and $b_2$ represents the out-going wave at the port 110. For some embodiments, the spectrum analyzer 112 measures the power of the out-going (received) wave $b_2$ in response to the in-going (transmitted) wave $a_1$. The ratio of their magnitudes is given by the scattering parameter $S_{21}$, which is equal to $S_{12}$ for passive two-port microwave networks. A resonant frequency (wavelength) can be measured by determining a peak magnitude of the scattering parameter $S_{21}$.

A processor 118 is coupled to the spectrum analyzer 112. In some embodiments, the processor 118 controls the spectrum analyzer 112. The processor 118 receives from the spectrum analyzer 112 a resonance parameter indicative of a resonant frequency or wavelength of the RF resonator 102 (i.e., the cavity 104). For example, the resonance parameter can be the numerical value of the resonant wavelength. In other applications, the resonance parameter can be a compressed or encoded representation of the resonant frequency or wavelength, so that the resonant frequency or wavelength is determined from the value of the resonance parameter. In describing embodiments, the resonance parameter of interest will be taken as the wavelength, it being understood that the description of embodiments is equally applicable to where the frequency is the determined quantity rather than the wavelength.

The processor 118 is coupled to a memory 120. In some embodiments, the memory 120 is integrated with the processor 118. The memory 120 stores a look-up table 122. The look-up table 122 is a data structure storing two sets of values: a set of values of a resonant parameter, such as wavelength; and a set of values of a length parameter, such as the length x of the tuning element 106 inside the cavity 104. Given a value of a resonant parameter, such as wavelength, the processor 118 uses the given value of the resonant parameter as an index into the look-up table 122 to retrieve a value of the length parameter. If the given value of the resonant parameter provided by the spectrum analyzer 112 is not found in the look-up table 122, the processor 118 can use an interpolation procedure to find the closest value as an index into the look-up table 122.

In an automotive application, a steering mechanism 124 is mechanically coupled to the tuning element 106. The steering mechanism 124 comprises a steering wheel, where for some embodiments the rotation of the steering wheel causes a rotation of the tuning element 106, and where the tuning element 106 is threaded so that a rotation is translated into a vertical motion. In an automotive application, the processor 118 can be an automotive processor, such as an engine management controller.

A loop antenna 126 couples the port 108 to the cavity 104, and a loop antenna 128 couples the port 110 to the cavity 104. The spectrum analyzer 112 transmits a signal to the port 108, i.e., the wave $a_1$, and this transmitted signal excites one or more electromagnetic modes in the cavity 104. The excitation causes an out-going signal from the port 110, i.e., the wave $b_2$, which propagates to the spectrum analyzer 112. The loop antenna 126 or the loop antenna 128 comprises one or more turns of wire.

Figure 2:
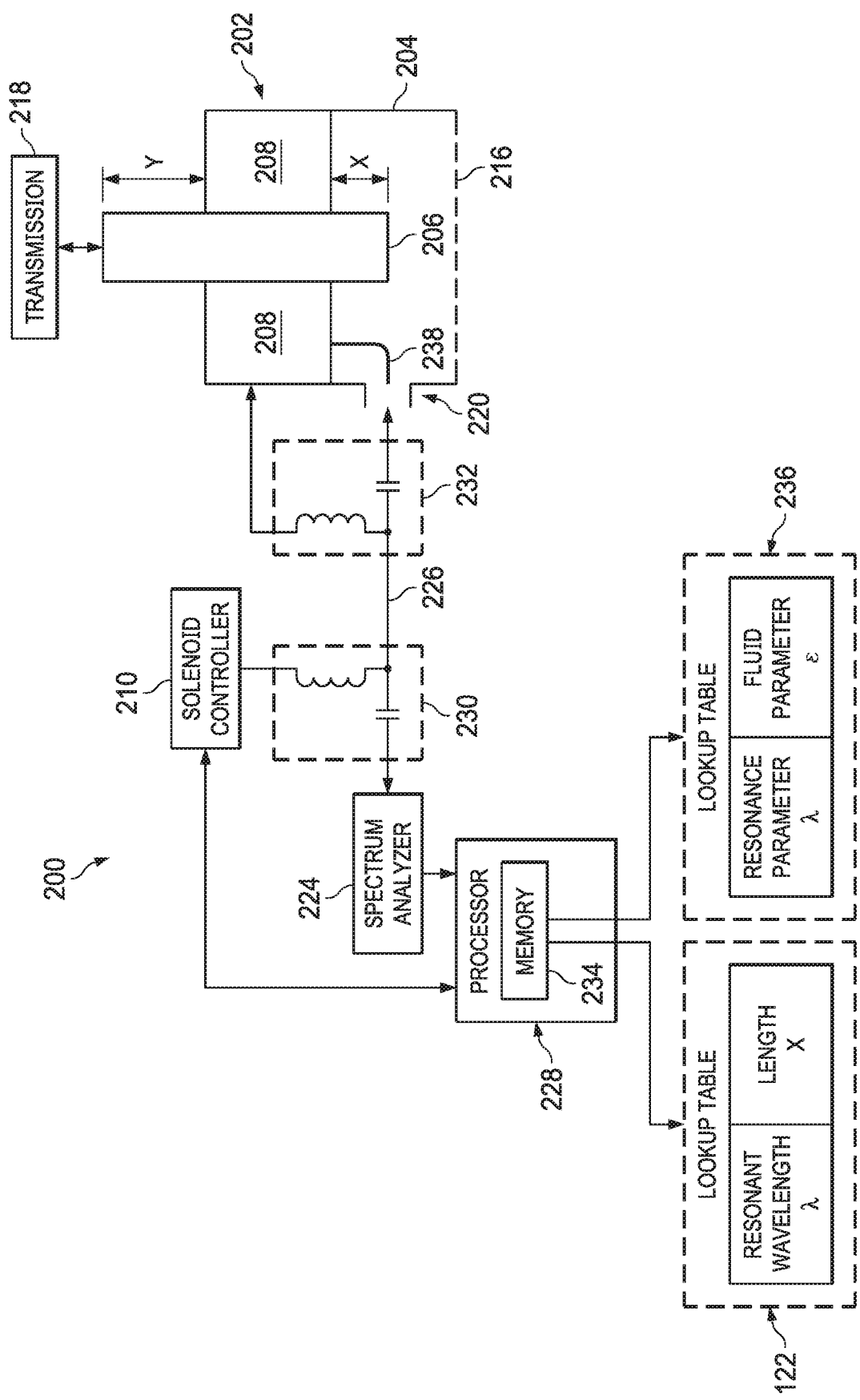
FIG. 2 shows a system in accordance with various examples.

FIG. 2 shows an illustrative system 200. A solenoid actuator 202 comprises a cavity 204 and a plunger 206. The plunger 206 has a length inside the cavity 204, denoted by a parameter x in FIG. 2. A solenoid 208 provides a magnetic field to control the length of the plunger 206 inside the cavity 204. A solenoid controller 210 provides drive current to the solenoid 208.

In the particular embodiment of FIG. 2, the solenoid actuator 202 is a component used in a transmission 218. In some embodiments, a measurement of the length of the plunger 206 extending outside the solenoid 208 is important for the operation of the transmission 218. This length is denoted by the parameter y, where a double arrow 212 denotes a coupling or measurement activity of the solenoid actuator 202 with respect to the transmission 218.

In some embodiments, the solenoid actuator 202 is part of a valve in the transmission 218, where the parameter y is measured to control the degree to which the valve is opened. Because the plunger 206 is of fixed length, the parameter y is known once the parameter x is measured. Accordingly, although in some embodiments the parameter y is the measurement of interest, without loss of generality embodiments are described in which reference is made to measuring the parameter x, it being understood that measuring the parameter x is effectively equivalent to measuring the parameter y. In some embodiments, the solenoid actuator 202 has functions other than providing fluid control in an automotive transmission.

The plunger 206 acts as a tuning element for the cavity 204, so that the length x of the plunger inside the cavity 204 affects the resonant frequency (wavelength) of the cavity 204. The plunger 206 (or at least that portion of the plunger 206 inside the cavity 204) is conductive, and for some embodiments is a metal.

In some embodiments, the solenoid actuator 202 includes a fluid within the cavity 204. In the embodiment of FIG. 2, the cavity 204 includes orifices or openings, e.g., an opening 216, to receive or exchange fluid with other components. In an automotive transmission application, the cavity 204 can exchange fluid with the transmission 218. The condition of the fluid affects the resonant frequency (wavelength). If the solenoid controller 210 puts the solenoid actuator 202 into a known state, then a resonance parameter, e.g., the resonant wavelength, can be measured and compared to a baseline to determine the condition of the fluid.

For example, before the solenoid actuator 202 is put into use, with the plunger 206 in a position corresponding to zero drive current to the solenoid 208, the resonant wavelength can be measured for fluids in different known conditions. By measuring the resonant wavelength over varying fluid conditions, a table of values can be built up by which the fluid condition can be determined when the solenoid actuator 202 is in use. For example, in an automotive transmission application, measuring the resonant wavelength over time at instances in which the solenoid actuator 202 is in an off-state can yield information as to whether the transmission fluid should be replaced.

The cavity 204 comprises a port 220. In the particular example of FIG. 2, the cavity 204 has only one port for coupling to a spectrum analyzer 224, and in this example the cavity 204 is a one-port network. In some embodiments, the cavity 204 comprises two ports, so that its resonant wavelength can be measured as discussed with respect to the embodiment of FIG. 1.

A waveguide 226 coupled the spectrum analyzer 224 to the port 220. In some embodiments, the spectrum analyzer 224 determines the resonant wavelength by measuring the received power in response to transmitting a signal. A dip in the received power denotes a resonance. In some embodiments, the resonant frequency at the third or fifth harmonic is measured. The spectrum analyzer 224 provides to a processor 228 a resonance parameter indicative of the resonant frequency (wavelength).

In the particular embodiment of FIG. 2, the system 200 includes a circuit network 230 and a circuit network 232 coupled to the waveguide 226 so that the solenoid controller 210 can utilize the waveguide 226 to provide direct current (DC) to the solenoid 208. In other embodiments, separate conductors are utilized to provide DC to the solenoid 208.

The processor 228 is coupled to a memory 234. In some embodiments, the memory 234 is integrated with the processor 228. The memory 234 stores two data structures: the look-up table 122 as described with respect to the embodiment of FIG. 1; and a look-up table 236. The look-up table 236 is a data structure storing two sets of values: a set of values denoting a resonant parameter, such as wavelength; and a set of values of a fluid parameter. In some embodiments, the fluid parameter denotes the life expectancy of the fluid.

In some embodiments, the processor 228 provides to the solenoid controller 210 the values of the length parameter retrieved from the look-up table 122. In this way, a closed loop feedback is realized to facilitate the solenoid controller 210 in controlling the position of the plunger 206.

Given a value of a resonant parameter, such as wavelength, the processor 228 uses the given value of the resonant parameter as an index into the look-up table 236 to retrieve a value of the fluid parameter. If the given value of the resonant parameter provided by the spectrum analyzer 224 is not found in the look-up table 236, the processor 228 can use an interpolation procedure to find the closest value as an index into the look-up table 236.

The solenoid actuator 202 can be viewed as an RF resonator. An antenna loop 238 couples the port 220 to the cavity 204. As described above, for some embodiments the cavity 204 is a two-port network, such as the cavity 104 in the embodiment of FIG. 1. In some embodiments, the cavity of 104 of FIG. 1 is a one-port network, in which case the spectrum analyzer 112 measures the resonant wavelength in the same way as is done for the embodiment of FIG. 2 where the cavity 204 is a single-port network.

Figure 3:
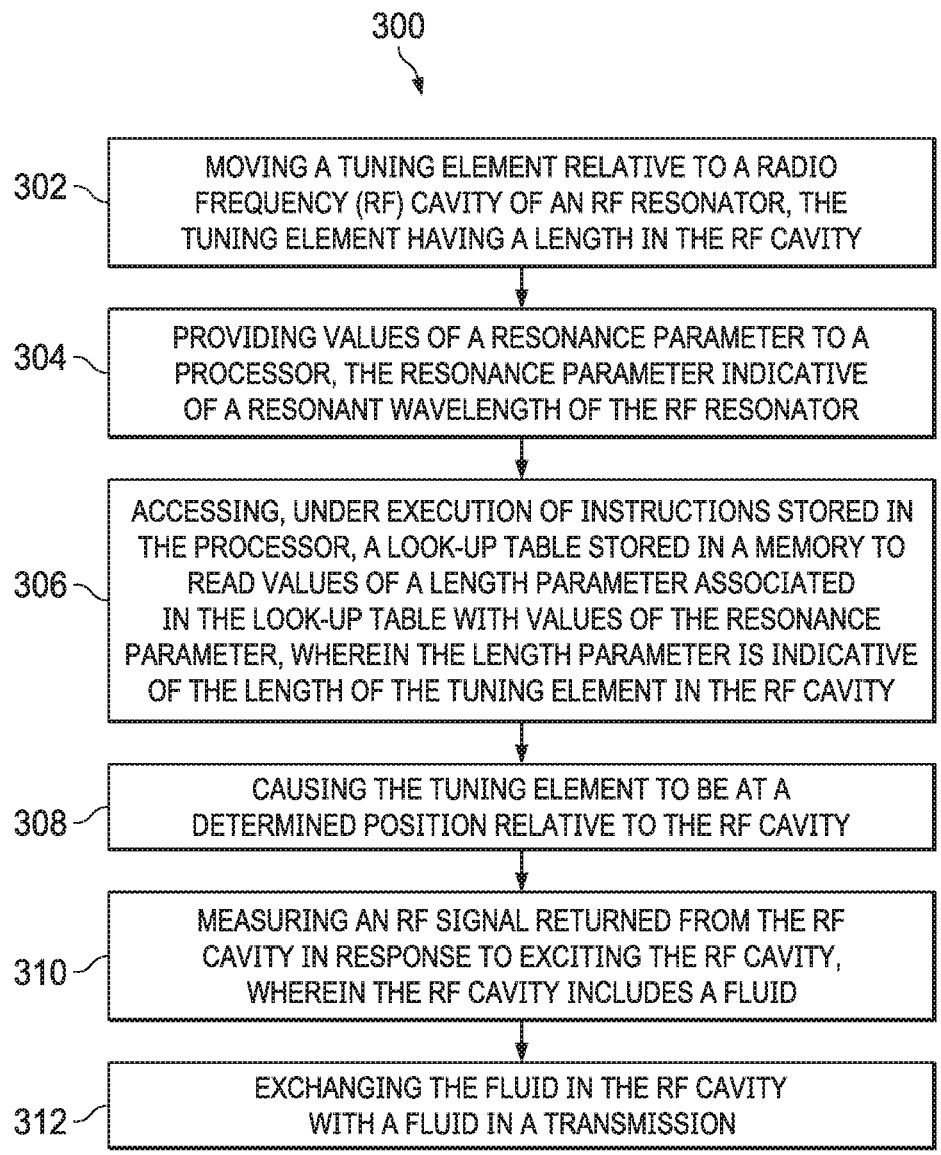
FIG. 3 shows a method in accordance with various examples.

FIG. 3 shows an illustrative method 300. Some or all of the steps in the method 300 are applicable to the embodiments described with respect to FIG. 1 or FIG. 2. The method 300 includes: moving, in step 302, a tuning element (e.g., 106 or 206) relative to a RF cavity (e.g., 104 or 204) of an RF resonator (e.g., 102 or 202), the tuning element having a length in the RF cavity; providing, in step 304, values of a resonance parameter to a processor (e.g., 118 or 228), the resonance parameter indicative of a resonant wavelength of the RF resonator; and accessing, in step 306, under execution of instructions stored in the processor, a look-up table (e.g., 122) stored in a memory (e.g., 120 or 234) to read values of a length parameter associated in the look-up table with values of the resonance parameter, wherein the length parameter is indicative of the length of the tuning element in the RF cavity.

In some embodiments, the illustrative method 300 further includes: causing, in step 308, the tuning element to be at a determined position relative to the RF cavity; and measuring, in step 310, an RF signal returned from the RF cavity in response to exciting the RF cavity, wherein the RF cavity includes a fluid.

In some embodiments, the illustrative method 300 further includes exchanging, in step 312, the fluid in the RF cavity with a fluid in a transmission (e.g., 218).

In some embodiments, instructions stored in a memory, e.g., the memory 120 or 234, when executed by a processor, e.g., the processor 118 or 228, cause the processor to perform some or all of the procedure of FIG. 3.

In some embodiments, the spectrum analyzer 112 is integrated with the cavity 104, and the spectrum analyzer 224 is integrated with the cavity 204, where the processors can communicate with the spectrum analyzers by way of a bus.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a radio frequency (RF) resonator comprising a cavity and a tuning element, the cavity having at least one port, and the tuning element having a length inside the cavity;
a processor;
a spectrum analyzer coupled to the at least one port, the spectrum analyzer to provide to the processor values of a resonance parameter, the resonance parameter indicative of a resonant wavelength of the RF resonator; and
an automotive steering mechanism coupled to the tuning element;
wherein the at least one port comprises a first port and a second port, the system further comprising:
a first loop antenna coupled to the first port; and
a second loop antenna coupled to the second port;
wherein the spectrum analyzer comprises an RF transmitter and an RF receiver, the RF transmitter comprising an output port coupled to the first loop antenna, and the RF receiver comprising an input port coupled to the second loop antenna.

2. The system of claim 1, wherein
the steering mechanism comprises a steering wheel, and
the length of the tuning element inside the cavity changes in response to a rotation of the steering wheel.

3. The system of claim 1, wherein the resonant wavelength is a first or higher order odd harmonic of the RF resonator.

4. The system of claim 3, wherein the higher order odd harmonic is a third or fifth harmonic of the RF resonator.

5. The system of claim 1, further comprising:
a memory coupled to the processor,
wherein the memory stores a look-up table and instructions, wherein the instructions when executed by the processor cause the processor to compute a value indicative of the length inside the cavity based upon the look-up table and a value of the resonance parameter provided by the spectrum analyzer.

6. The system of claim 5, wherein the memory is integrated with the processor.

7. The system of claim 1, wherein the tuning element and the cavity each comprises metal.

8. The system of claim 1, wherein the spectrum analyzer measures a magnitude of a scattering parameter of the RF resonator to provide to the processor the values of the resonance parameter.

9. A system comprising:
a radio frequency (RF) resonator comprising a cavity and a tuning element, the cavity having at least one port, and the tuning element having a length inside the cavity;
a processor;
a spectrum analyzer coupled to the at least one port, the spectrum analyzer to provide to the processor values of a resonance parameter, the resonance parameter indicative of a resonant wavelength of the RF resonator; and
an automotive steering mechanism coupled to the tuning element;
wherein the at least one port comprises a first port, the system further comprising:
a loop antenna coupled to the first port;
wherein the spectrum analyzer comprises an RF transmitter, the RF transmitter comprising an output port coupled to the loop antenna, and wherein the spectrum analyzer measures a reflected power in response to transmission by the RF transmitter to provide to the processor the values of the resonance parameter.

* * * * *